United States Patent Office 3,654,252
Patented Apr. 4, 1972

3,654,252
ALKALI RESISTANT POLYMERS AND
METHOD THEREFOR
Charles F. Capizzi, 4904 Harmon Ave.,
Las Vegas, Nev. 89109
No Drawing. Filed Jan. 29, 1970, Ser. No. 6,960
Int. Cl. C08f 3/30, 27/00
U.S. Cl. 260—92.8 A      4 Claims

ABSTRACT OF THE DISCLOSURE

The reaction products of vinyl chloride polymers (e.g. polyvinyl chloride) and trichloroethylene which are useful as coatings to protect surfaces from the action of acids and bases. Said products are formed by dissolving polyvinyl chloride in a ketone solvent. The polyvinyl chloride is then reacted with trichloroethylene by application of heat in the absence of air or by evaporating the solvent by heating same or by allowing the reaction mixture to stand at room temperature.

BACKGROUND OF THE INVENTION

Vinyl chloride polymers (i.e. polyvinyl chloride and copolymers containing repeating units of vinyl chloride such as copolymers of polyvinyl chloride/acetate, plasticized polyvinyl chloride, etc.) have a great many uses because of their adaptability to being modified by plasticizers to produce resins which range in flexibility from soft to hard and have resistance to chemical penetration. However, without utilizing stabilizers vinyl chloride polymers will degrade rapidly, particularly at higher temperatures. In addition, vinyl chloride polymers are attacked at higher temperatures by alkalies.

It has long been a desideratum in the art to produce a vinyl chloride polymer which has the desirable features of such polymers but which will not be attacked by alkali even when in contact therewith for long periods of time at elevated temperatures.

SUMMARY OF THE INVENTION

The present invention is based, inter alia, on the surprising discovery that an alkaline resistant resin can be produced from vinyl chloride polymers and trichloroethylene.

As is well known, trichloroethylene is an inexpensive and readily available material and therefore if it could be utilized to modify known polyvinyl chloride type polymers this would be a distinct step forward in the art.

I have discovered that, under certain conditions, trichloroethylene can be reacted with vinyl chloride polymers in a simple and economical manner without requiring special equipment, high pressures, high temperatures, etc.

In order to react trichloroethylene with polyvinyl chloride under conditions which are economical it is necessary to include with the reactants, i.e. trichloroethylene and polyvinyl chloride, a ketone solvent for the polyvinyl chloride which is preferably a cyclic alkyl ketone (e.g. cyclohexanone) or an alkyl ketone having, preferably, the formula

wherein each of R and R' is lower alkyl, e.g. having from 1 to 6 carbon atoms.

It is therefore a principal object of the present invention to disclose and provide an economical method for modifying a vinyl chloride polymer.

Another object of the present invention is to embody a simple and economical method which does not require special equipment, high pressures and high temperatures for reacting polyvinyl chloride with trichloroethylene.

A further object of the present invention is to embody a method for producing a modified polyvinyl chloride resin utilizing a readily available and inexpensive ketone solvent.

Still a further object of the present invention is to disclose and provide a polymer or resin which is highly resistant to alkalies and which can be utilized to provide protective coatings for metal walls such as found in railroad tank cars.

Another and further object of the present invention is to provide a polyvinyl chloride resin which is the reaction product of a vinyl chloride containing polymer and trichloroethylene.

The accomplishment of these and other objects will be apparent from the following detailed description in which percentages and parts are all by weight unless otherwise indicated.

DESCRIPTION OF THE PREFERRED EMBODIMENTS

In the preferred practice of the present invention it is necessary to utilize three components; two reactants and a ketone solvent.

One of the reactants is a vinyl chloride containing polymer. Vinyl chloride containing polymers are well known in the art and this invention is not predicated on their structure per se. As is well known, vinyl chloride containing polymers have repeating units of the following formula:

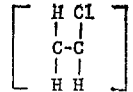

In addition to having repeating units of vinyl chloride, polymers containing vinyl chloride groups can also contain vinyl acetate groups. These are normally known as vinyl chloride/acetate copolymers. The amount of vinyl acetate in the copolymer usually ranges from around 2% to 15% of the composition depending upon the flexibility needed and the solubility. A greater amount of vinyl acetate in the copolymer, the greater the flexibility and solubility.

The other reactant, i.e. the compound which reacts with the polyvinyl chloride, of this invention is trichloroethylene which has the following formula:

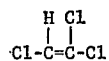

Insofar as I am aware there has been no indication hitherto that trichloroethylene could react with a polyvinyl chloride type of polymer. It appears necessary in order for the reaction to take place that the polyvinyl chloride be at least partially solubilized in a particular type of solvent, i.e. a ketone solvent. Among the preferred ketone solvents are aliphatic solvents having from 2 to 14 carbon atoms (excluding the carbon atom of the ketone group) and, most preferably, the ketone solvent is cyclic alkyl ketone or a lower alkyl ketone having, e.g. the following formula:

wherein each of R and R' is lower alkyl. Examples of ketones which work remarkably well are methyl ethyl ketone, methyl isobutyl ketone and cyclohexanone.

The amount of each of the components listed above is not particularly critical. For example, with respect to the solvent, or mixture of solvents, for the polyvinyl chloride it is only necessary that there be a sufficient amount of solvent to dissolve the polyvinyl chloride. This is easily determined by routine experimentation. Purely by way of exemplification, I have observed that as little as 2 parts solvent (methyl ethyl ketone) to 1 part polyvinyl chloride is satisfactory. Of course more solvent can be utilized, e.g. 6 parts solvent to 1 part vinyl chloride, and satisfactory results still obtained. Generally speaking, the ratio of solvent to polyvinyl chloride may be as little as 1:1 and can range upwards from that point to, e.g. 10–20:1. The only restriction on the amount of solvent is the economical impracticability of having to evaporate a great amount from the reaction solution with no incumbent advantages.

With respect to the amount of trichloroethylene it is similarly not critical. The amount of trichloroethylene may range anywhere from 50% to upwards of 500% by weight, based on the weight of the polyvinyl chloride; an excess of trichloroethylene is not detrimental. It appears that it is only necessary that from 50 to 100% by weight of trichloroethylene, based on the weight of the polyvinyl chloride, be present in the reaction solution.

Precisely what reaction is occurring is not, at present, known but it is clear that a reaction product of polyvinyl chloride and trichloroethylene is being formed. Presumably, the trichloroethylene is reacting with the repeating units of vinyl chloride since the reaction only occurs when such vinyl chloride repeating units are present. This is confirmed by observation of the infrared spectrum.

The conditions under which the reaction occur appear to be general in that the reaction occurs at room temperature by merely allowing the ketone solvent to evaporate. The reaction is apaprently completed in from 2 to 8 hours. The reaction time can be speeded up if the reaction solution is exposed to hot air (say about 140° F. to 180° F.) or steam. In the latter cases the reaction is completed much sooner, say from 10 minutes to 2 hours. As an alternate method, the mixture of vinyl chloride polymer, trichloroethylene, and ketone solvent can be placed in a container which is sealed from the air and then heated to a temperature of about 100° F. to the boiling point of trichloroethylene or the ketone solvent, whichever is lower. For example, when utilizing methyl ethyl ketone as the solvent the temperature of the solution in a sealed container would range from 100° F. to 175° F. Apparently, under these conditions, the reaction proceeds faster because the reaction is completed in as little as five minutes although it is preferred, in order to insure completion of the reaction, to allow 10 minutes to a half hour.

The following examples are presently preferred embodiments and are set forth solely to illustrate the invention and are not to be considered limiting.

EXAMPLE I

One part by weight of polyvinyl chloride is dissolved in two parts by weight of a mixture of tetrahydrofuran, methyl ethyl ketone, and cyclohexanone (the mixture containing equal amounts of each of the solvents) by stirring. The solution of polyvinyl chloride is then intimately admixed with two parts of trichloroethylene and one part of acetone. The thus prepared solution is then dried with hot air (the temeprature being about 140° F.) until a gray plastic is produced which is relatively stable to heat. The plastic has the following properties.

Physical properties:

Modulus of elasticity—$1.78 \times 10^{-36}$
Melting point—340° C.
Color—Gray
Density—7.8956
Hardness—3.5 on C The above palstic has been utilized in paints, protective coatings, and for making toys. Moreover, it has been tested for over six months in sodium hydroxide and, at the end of six months, did not show any signs of deterioration.

EXAMPLE II

Two parts by weight of methyl ethyl ketone was mixed with one part by weight of polyvinyl chloride. Thereafter two parts by weight of trichloroethylene was added and the entire mixture stirred. The thus obtained mixture was put into a reaction vessel and tightly sealed so that no air could enter the vessel. Thereafter, it was heated to a temperature of about 150° F. for five minutes. The solvents were then evaporated off and the thus produced plastic had approximately the same properties as those of the plastic above except the plastic was more flexible and fire resistant.

EXAMPLE III

To one part by weight of a copolymer of vinyl chloride and vinyl acetate was added two parts by weight of trichloroethylene and two parts by weight of methyl ethyl ketone. The thus obtained mixture was then dried with hot air for about 4 to 8 hours. A clear plastic was obtained which could withstand sodium hydroxide for six months. The plastic had properties similar to those set forth above.

A mixture exactly the same as set forth in this example was allowed to stand at room temperature for eight hours. At the end of eight hours a plastic exactly the same as that set forth above was obtained.

While I have described this invention with respect to certain specific embodiments and applications, it is understood that various modifications may be made thereof without departing from the spirit and scope of the invention as claimed hereinafter.

I claim:

1. A method for producing a resin which is highly resistant to sodium hydroxide and other alkalies which comprises:
    forming a solution of a vinyl chloride polymer in methly ethyl ketone, the amount of methyl ethyl ketone being sufficient to dissolve the vinyl chloride polymer, and trichloroethylene, allowing the solution to stand at a temperature sufficient to cause reaction between the vinyl chloride polymer and the trichloroethylene and removing the methyl ethyl ketone solvent therefrom.

2. A method according to claim 1 wherein the vinyl chloride resin is polyvinyl chloride.

3. A method according to claim 1 wherein the ratio of methyl ethyl ketone solvent to vinyl chloride polymer is from 1–20:1.

4. The product obtained by reacting a solution of vinyl chloride polymer and trichloroethylene, the vinyl chloride polymer being dissolved in methyl ethyl ketone.

References Cited

UNITED STATES PATENTS 3,219,729    11/1965    Meyers et al. _____ 260—899

FOREIGN PATENTS 1,002,039    8/1965    Great Britain _____ 260

HARRY WONG, Jr., Primary Exmainer

J. A. DONAHUE, Jr., Assistant Examiner

U.S. Cl. X.R.

260—87.1, 87.5 R, 32.8